US012809943B1

(12) United States Patent
Romero Calvo et al.

(10) Patent No.: US 12,809,943 B1
(45) Date of Patent: Nov. 24, 2026

(54) AGGREGATED DOCUMENT REPRESENTATIONS FOR GENERATING DOMAIN AWARE SIMILARITY MODELS

(71) Applicant: Amazon Technologies, Inc., Seattle, WA (US)

(72) Inventors: Miguel Romero Calvo, London (CA); Theodore Alex Rogers, Mission Viejo, CA (US); Sungmin Hong, San Jose, CA (US); Anveshi Charuvaka, Tracy, CA (US); Lin Lee Cheong, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 679 days.

(21) Appl. No.: 18/344,760

(22) Filed: Jun. 29, 2023

(51) Int. Cl.
*G06F 16/00* (2019.01)
*G06F 18/2415* (2023.01)
*G06N 5/02* (2023.01)

(52) U.S. Cl.
CPC ........... *G06F 18/2415* (2023.01); *G06N 5/02* (2013.01)

(58) Field of Classification Search
CPC .............................. G06F 18/2415; G06N 5/02
See application file for complete search history.

(56) References Cited

U.S. PATENT DOCUMENTS

| | | | | |
|---|---|---|---|---|
| 9,715,495 | B1 * | 7/2017 | Tacchi | G06F 16/358 |
| 9,852,337 | B1 * | 12/2017 | van Rotterdam | G06F 16/335 |
| 10,452,696 | B2 * | 10/2019 | Wang | G06F 16/33 |
| 11,275,893 | B1 * | 3/2022 | Zaman | G06F 40/169 |
| 11,574,128 | B2 * | 2/2023 | Mattivi | G06N 3/045 |
| 11,922,124 | B2 * | 3/2024 | Mattivi | G06F 40/30 |
| 12,197,479 | B2 * | 1/2025 | Cheng | G06F 16/3347 |
| 12,361,742 | B2 * | 7/2025 | van Rotterdam | G06F 16/335 |
| 12,619,819 | B1 * | 5/2026 | Zhang | G06F 40/279 |
| 2003/0200077 | A1 * | 10/2003 | Leacock | G06F 16/3344 707/E17.08 |
| 2006/0136589 | A1 * | 6/2006 | Konig | G06F 16/9535 709/224 |
| 2008/0114721 | A1 * | 5/2008 | Jones | G06F 16/3338 |
| 2008/0319974 | A1 * | 12/2008 | Ma | G06F 16/29 707/999.005 |
| 2012/0136812 | A1 * | 5/2012 | Brdiczka | G06F 16/335 707/E17.084 |
| 2013/0166539 | A1 * | 6/2013 | Clark | G06F 16/2452 707/722 |
| 2013/0232129 | A1 * | 9/2013 | Cheng | G06F 16/3338 707/706 |
| 2014/0074829 | A1 * | 3/2014 | Schmidt | G06F 16/248 707/723 |
| 2014/0172847 | A1 * | 6/2014 | Wiegering | G06F 16/24578 707/728 |

(Continued)

*Primary Examiner* — Jean M Corrielus
(74) *Attorney, Agent, or Firm* — S. Scott Foster; Kowert, Hood, Munyon, Rankin & Goetzel, P.C.

(57) ABSTRACT

Aggregated representations may be used for generating domain aware similarity models. A set of documents may be obtained and encode as semantic feature vectors according to the content of the documents, domain feature vectors using domain terms identified from the content of the documents, and topic feature vectors using domain topic terms provided via an interface. A combination of these feature vectors can be combined to generate the domain aware similarity model.

20 Claims, 9 Drawing Sheets

(56) References Cited

U.S. PATENT DOCUMENTS

| | | | | |
|---|---|---|---|---|
| 2015/0310096 | A1* | 10/2015 | Bao | G06F 16/367 707/738 |
| 2018/0004843 | A1* | 1/2018 | Koperski | G06F 16/951 |
| 2018/0068183 | A1* | 3/2018 | van Rotterdam | G06V 30/40 |
| 2018/0365316 | A1 | 12/2018 | Liang et al. | |
| 2019/0050394 | A1* | 2/2019 | Rajpathak | G06F 16/93 |
| 2019/0180327 | A1* | 6/2019 | Balagopalan | G06F 16/3347 |
| 2019/0236206 | A1* | 8/2019 | Chowdhury | G06F 16/3344 |
| 2020/0074322 | A1* | 3/2020 | Chungapalli | G06F 18/29 |
| 2020/0117751 | A1* | 4/2020 | Kim | G06F 16/313 |
| 2021/0141822 | A1* | 5/2021 | McLeod | G06F 16/353 |
| 2021/0383068 | A1* | 12/2021 | Mattivi | G06F 40/20 |
| 2022/0027748 | A1* | 1/2022 | Muschett | G06F 40/30 |
| 2022/0374598 | A1* | 11/2022 | Osuala | G06N 20/00 |
| 2023/0109045 | A1* | 4/2023 | Mattivi | G06N 3/09 704/9 |

* cited by examiner

AGGREGATED DOCUMENT REPRESENTATIONS FOR GENERATING DOMAIN AWARE SIMILARITY MODELS

BACKGROUND

Understanding similarity between different items, such as documents, is used to perform a wide variety of tasks in different systems, services, or applications. Recommendation systems, for example, may rely upon a similarity determination between two different items in order to recommend an item based on its similarity to another item. Given the potentially large number of items for which similarity determinations may be made, the quality and efficiency of similarity analysis techniques can affect the performance of the systems, services, or applications which rely upon similarity analysis.

Figure 1:
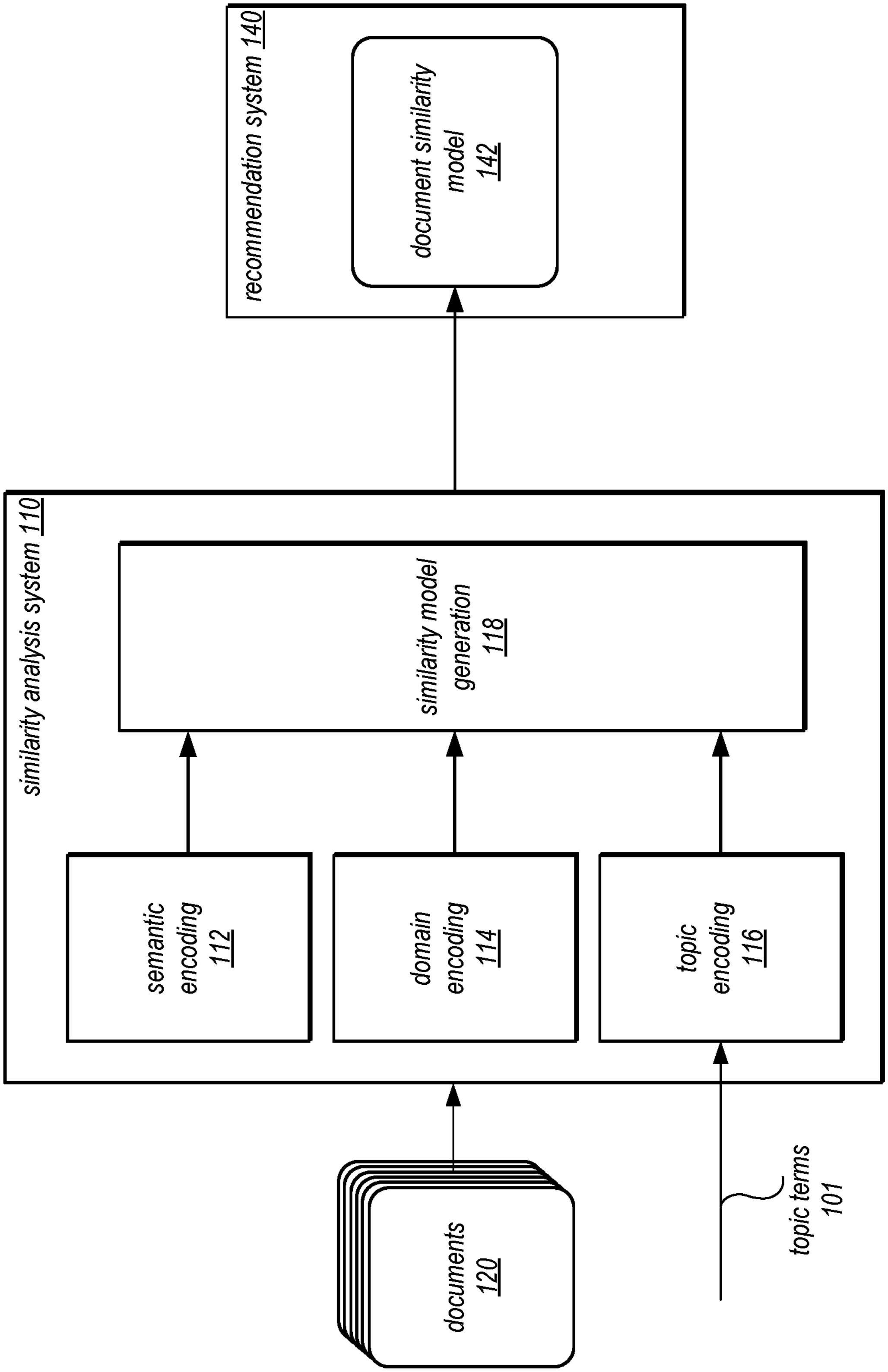
FIG. 1 is a logical block diagram illustrating aggregated document representations for generating domain aware similarity models, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for aggregated document representations for generating domain aware similarity models are described herein. Organizations which exist in esoteric domains are unable to construct meaningful recommendations that explicitly consider nuanced aspects of their domain without investing large amounts of effort manually building a system around that domain. In existing approaches, large annotation and science teams are required to identify and curate the relationships between content. In addition to resource costs, this overhead prohibits fast iteration of new systems (which could make user of domain similarity for recommendations), requiring months of development time to make small changes.

Systems that serve content have systems to automate content similarity recommendations, but they are not domain aware. Instead, such systems predominantly function by using language models to determine the semantic similarity between two documents. They cannot consider or detect terminology which has high value in a domain. The utility for domain specific recommendations may rely on the ability to understand nuanced concepts that are relevant to their target user group. For example, in existing systems, a tutorial explaining how to use a specific industrial tool would likely be considered highly similar to another tutorial covering a completely different concept. Both documents may share 95% similar language (e.g., instructional language) without sharing any high value domain terminology, such as the specific product or the use case. This results in users being shown recommendations that a user with domain knowledge would not find similar.

Some concepts to identify high value terms have been theorized but have large flaws preventing their practical use. These theories function by observing the words that are most unique to a given document, and penalize words terms that have a high co-occurrence between documents. These common words are highly valuable terms in a domain. Other approaches compare two domains and identify the terms that have limited intersection. However, it may be the case that two terms are significant to both domains; a challenge also exists with identifying a comparison domain. These and other similarity modeling challenges can prevent systems from adapting similarity modeling in order to perform various tasks including, but not limited to, recommendation tasks.

For the reasons discussed above, it may be highly desirable to integrate their existing domain knowledge to augment any system that is created that performs or relies upon similarity analysis. To allow development with limited resources, the system should take as input the documents to be recommended and any existing domain knowledge. It should automatically identify domain significant terms, and these tag these terms in each documents. It should enable a high level of user review and intervention. Techniques for aggregated document representations for generating domain aware similarity models may provide these beneficial features, improving both the development technologies for building such systems as well as improving the performance of the systems themselves, as the greater inclusion of domain-aware similarity models can improve the similarity analysis in computer related technologies and consequently the downstream tasks performed using similarity analysis (also in computer related technologies).

FIG. 1 is a logical block diagram illustrating aggregated document representations for generating domain aware similarity models, according to some embodiments. Similarity analysis system 110 may be implemented as a standalone system or as part of a suite or set of services, systems, or applications, such as a service of a provider network as discussed below with regard to FIG. 2. Similarity analysis system 110 may receive or otherwise obtain documents 120 to be considered for a similarity model. Documents 120 may include various data files and formats. For example, documents may be analogous to physical documents (e.g., text files, portable document format (PDF), etc.), digital or non-physical documents (e.g., html pages (e.g., stored as Hypertext Markup Language (HTML) documents), blog posts, JavaScript Object Notation (JSON) documents, data objects or other digital content that can be considered documents, such as data items, records or files (including non-text files such as audio, video, or image data) in object stores, non-relational data stores, or document-based data stores. For example, in some embodiments, video data may be considered a document with corresponding metadata files or information that describes the content of the video document, such as video summary, transcript, key words, etc.).

Similarity analysis system 110 may implement semantic encoding 112, domain encoding 114, and topic encoding 116, which may provide different ways of encoding documents 120 that can be aggregated to generate a similarity model at similarity model generation 118 can then be deployed for different types of systems that utilize the similarity model, such as document similarity model 142 deployed as part of recommendation system 140. Semantic encoding 112 may encode individual document signals leveraging pre-trained language models independently of the domain. These representations may be document-specific. For example, as discussed in detail below with regard to FIG. 3, semantic information may be extracted from each document (or associated files, such as metadata) using a pre-trained language model. Then, sentence-wise similarity may be used to create a similarity matrix which representing the semantic representations of each document.

Domain encoding 114 may encode domain information in an unsupervised manner (e.g. database, Machine Learning, etc. in technology documents), as discussed in detail below with regard to FIG. 3 and FIG. 7. This encoding may take into account both the specific document as well as the domain as a whole. In various embodiments, a domain may be a subject matter, area of knowledge, activity or set of related activities, or any other grouping of information that may share similarities that can be utilized to perform various tasks based on the similarities. For example, in domain encoding 114, domain terms may be automatically extracted from the documents 120 using statistical evaluation. First, statistically relevant domain terms may be partially identified in documents using various techniques. A histogram of the most common words may be created, in some embodiments, from words extracted from or associated with the document. Semantically similar words may then be grouped using semantic embeddings. For instance, a top p % groups (e.g., by count as indicated in the histogram) are selected and then converted to words again. Common terms may be inferred from generic documents. The detected common terms may then be subtracted from the terms obtained in top p % groups to create the candidate domain terms. Detected relevant domain terms may be augmented, in some embodiments, by training a few-shot Named Entity Recognition model which is then applied to the same documents to identify remaining domain terms. The domain terms for each document may then be grouped with their nearest synonyms, the number of occurrences for each group is quantified and normalized against the total words in the document. The output of domain encoding 114 may be feature vectors scoring each domain term synonym, in some embodiments.

Topic encoding 116 may encode a model creator's knowledge of the domain and characterize the documents 120 based on those signals (e.g. restaurant review system users might like to see similar type of restaurant, or technology review blogposts users might want to see blogs from the same industry). As indicated at 101, topic terms can be provided by a model creator. Creators can specify any known topic terms through specifying various types and ontologies (e.g. technical terms, or associated industry, etc.) and provides examples associated for each one (e.g. for the agriculture industry, “livestock” is a technical term and “crop rotation” is a process). Documents may be scanned for topic term occurrences. Additionally, in some embodiments, a Named Entity Recognition model may be trained and applied to identify other relevant topic terms similar to the provided topic terms 101 which can be used for augmentation. The topic terms for each document may then be grouped with their nearest synonyms, the number of occurrences for each group may be quantified and normalized against the total words in the document. The output of topic encoding 116 may be encoding feature vectors that provide a scoring for each topic term synonym.

Similarity model generation 118 may then combine the different encoding feature vectors produced by semantic encoding 112, domain encoding 112, and topic encoding 116. For example, similarity model generation 118 may normalize the distance distribution among vector representations to follow a similar distance distribution Then, normalized distances may then be combined into a single similarity measure using a customizable weighted average which allows the user to adjust the impact of the individual signals (e.g., from topic, domain, and/or semantic encoding stages). Then, the domain aware document similarity model 142 may be output as a similarity matrix for each encoding representation, in some embodiments.

As discussed in detail below with regard to FIGS. 4-5B, at various stages further creator input can be obtained to modify, tune, or otherwise change the generation of the domain aware document similarity model 142 by editing domain terms or topic terms, testing or viewing document similarity model 142, and modifying the way in which the document similarity model 142 is generated (e.g., by adjusting aggregation weights used at similarity model generation 118). Moreover, although recommendation system 140 is depicted as a deployment location for document similarity model 142 other types of systems may make user of document similarity models that are domain aware and thus the depiction of a recommendation system 140 is not intended to be limiting.

Please note that previous descriptions are not intended to be limiting, but are merely provided as an example of a similarity analysis system. Various other embodiments may also implement these techniques, as discussed in detail below.

The specification next includes a general description of a provider network, which may implement a similarity analysis service that implements aggregated document representations for generating domain aware similarity models. Then various examples of a similarity analysis service are discussed, including different components, or arrangements of components that may be employed as part of implementing a provider network. A number of different methods and techniques to implement aggregated document representations for generating domain aware similarity models are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
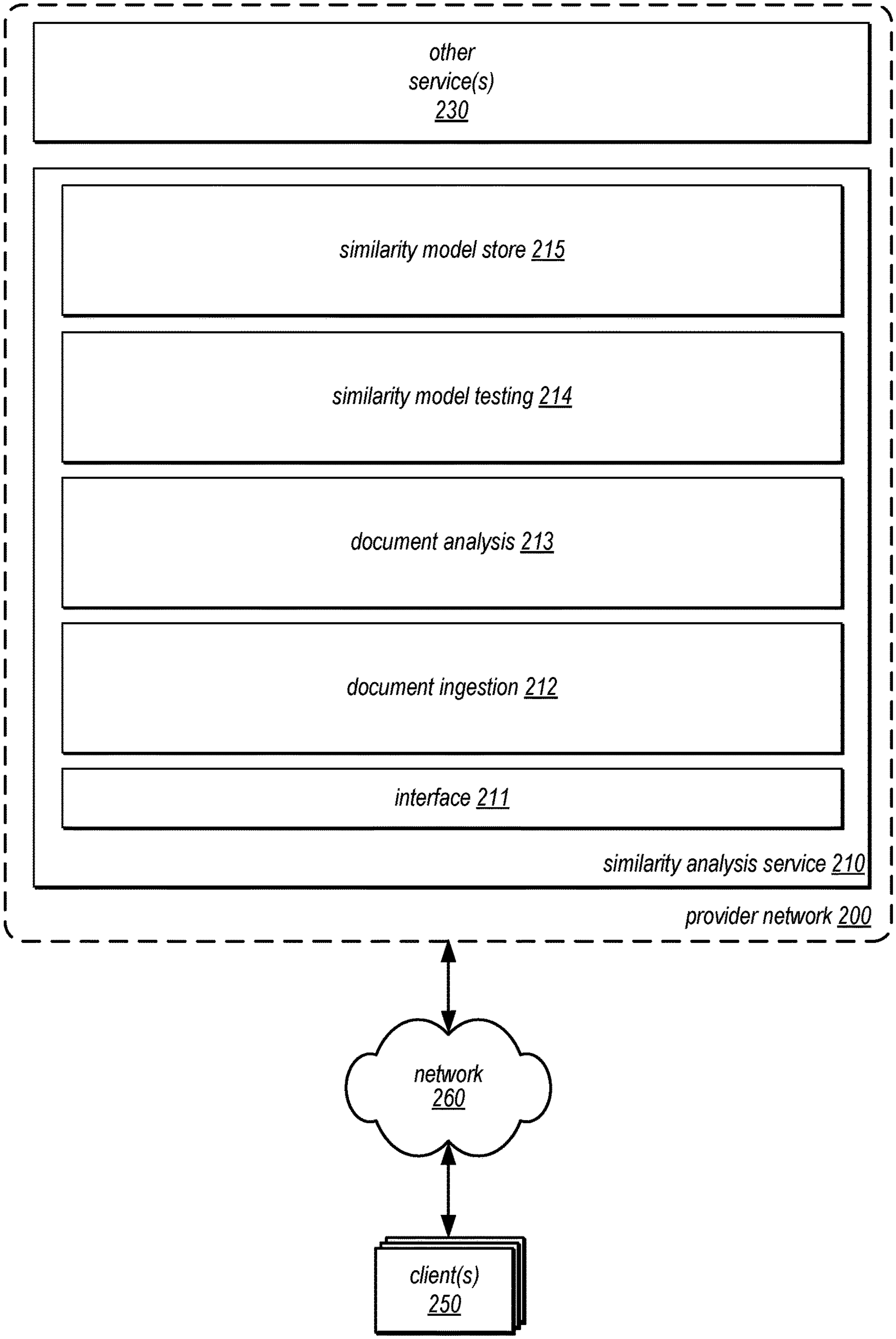
FIG. 2 is a logical block diagram illustrating a provider network that implements different services including a similarity analysis service that implements aggregated document representations for generating domain aware similarity models, according to some embodiments.

FIG. 2 is a logical block diagram illustrating a provider network that implements different services including a similarity analysis service that implements aggregated document representations for generating domain aware similarity models, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

As noted above, provider network 200 may implement various computing resources or services, such as similarity analysis service 210, and other service(s) 230 which may be any other type of network based services, including various other types of storage (e.g., database service or an object storage service), compute, data processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of similarity analysis service 210) may be implemented by a particular node or may be distributed across several nodes. In some embodiments, a given node may implement the functionality of more than one service system component (e.g., more than one data store component).

Similarity analysis service 210 may generate, test, modify, tune, or deploy domain aware similarity models. These models may be created from a set of documents provided to similarity analysis service 210 according to the various techniques discussed in detail below. For example, similarity analysis service 210 may implement document ingestion 212 which may handle obtaining documents for creation of domain aware similarity models. In some embodiments, document ingestion 212 may support batch document transfers, file transfers, interact with storage services, or otherwise obtain access to documents. In some embodiments, document ingestion 212 may perform various formatting, pre-processing, or otherwise preparing documents for document analysis 213. For instance, various types of documents may be supported, from scanned images of physical documents for which optical character recognition (OCR) techniques may be performed, document files in various formats, as well as other representations of document content, such as JSON, HTML, or various other document formats or representation technologies and/or obtain or generate metadata or other text information associated with documents that are content (e.g., audio, video, image data). For each of these, document ingestion 212 may ready the documents into a format that can be analyzed (e.g., generate a transcript using automatic speech recognition techniques for video or audio data, or generate labels, summaries, or text recognition for text included in image data).

Similarity analysis service 213 may implement document analysis 213, discussed in detail below with regard to FIG. 3, which may analyze a set of documents to generate a domain aware similarity model.

Similarity analysis 210 may implement similarity model store 215, which store generate domain aware similarity models. As different versions may be created, similarity model store 215 may implement versioning, tracking, or maintain other information that allows for a similarity model to be grouped or associated with related similarity models (e.g., sharing a common lineage of development). Similarity model store 215 may also provide similarity models for deployment (e.g., in other services 230 or in external systems, services or applications) as well as to similarity model testing 214. Similarity model testing 214 may implement various testing frameworks to allow a model creator to perform various queries, recommendations, or other similarity based tasks using a selected similarity model to understand the selected similarity model's performance.

Similarity analysis service 210 may implement an interface 211 to access and/or utilize various features of similarity analysis service 210. Such an interface may include various types of interfaces (as exemplified below with regard to FIGS. 4-5B), such as a command line interface, graphical user interface, and/or programmatic interface (e.g., Application Programming Interfaces (APIs)) in order to perform requested operations. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Generally speaking, clients 250 may encompass any type of client configurable to submit network-based requests to provider network 200 via network 260, including requests for services (e.g., a request to create a similarity model, provide topic terms, edit or add tags or other associations determined by document analysis 213 or another feature of similarity analysis service, deploy and/or test similarity models, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with similarity analysis service 210. However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
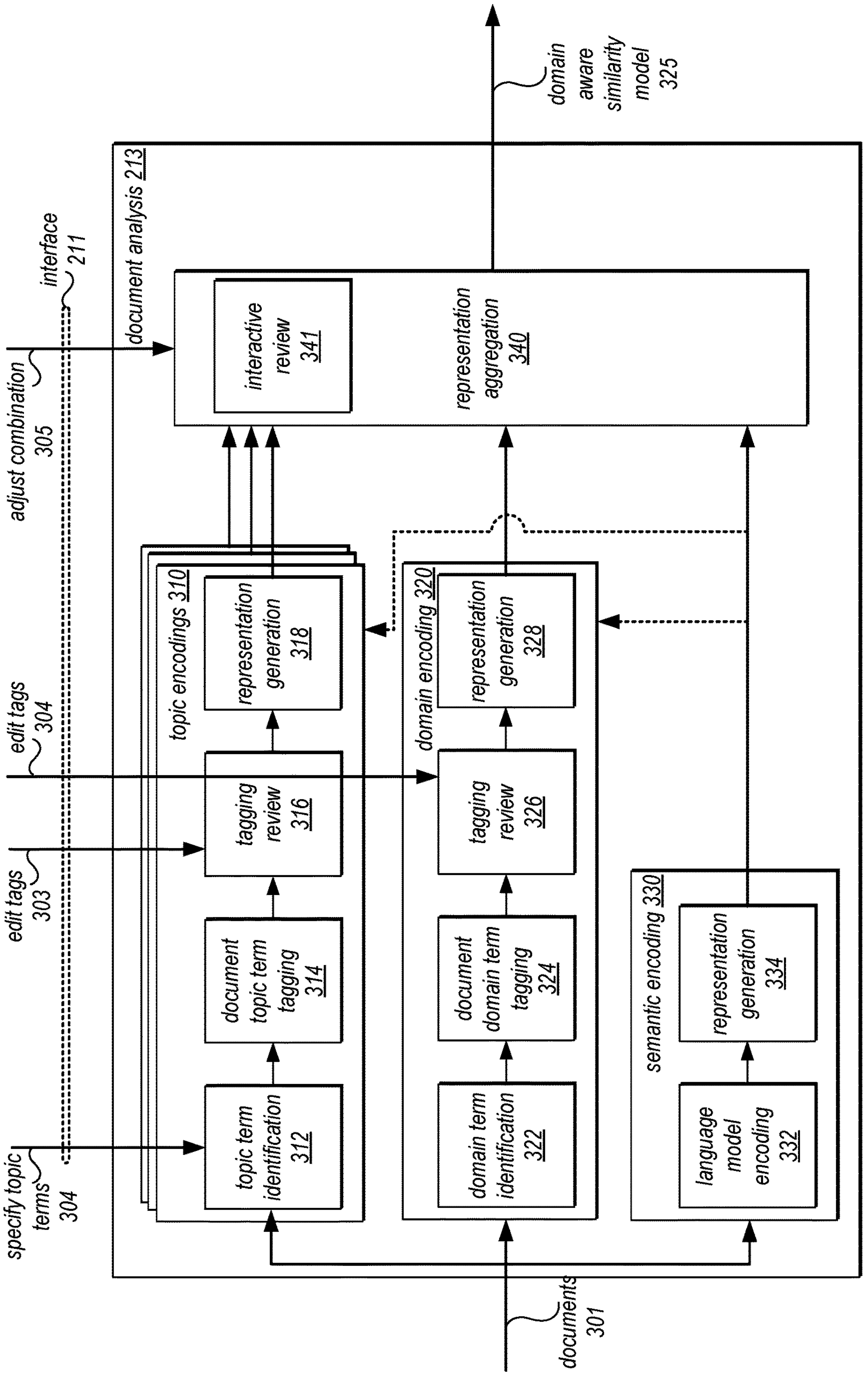
FIG. 3 is a logical block diagram illustrating different example encodings implemented as part of aggregated document representations for generating domain aware similarity models, according to some embodiments.

FIG. 3 is a logical block diagram illustrating different example encodings implemented as part of aggregated document representations for generating domain aware similarity models, according to some embodiments. Document analysis 213 may implement different topic encodings 310 for different topics created via interface 211. Topic terms may be specified as indicated at 304. For example, topic terms may include various types and ontologies (e.g. technical terms, or associated industry, etc.) and provides examples associated for each one (e.g. for the data storage field, "snapshot" is a technical term for a point-in-time copy of data and "migration" is a process for moving data between different data store locations and/or data store types).

Topic term identification may also evaluate documents 301 (e.g., using an NER model as discussed above with regard to FIG. 1) to identify further topic terms from the documents. For example, if given terms are "snapshot" and "migration," an NER model trained to recognize similar entities or processes may identify "backup" and "transfer" as further topic terms in the provided documents 301 to consider as part of topic encodings 310.

Document topic term tagging 314 may augment, annotate, or otherwise link different topic terms with individual ones of documents 301. For example, each document of document 301 may be evaluated for tagging the potential topic terms, both specified at 304 and derived from document topic term identification 312 using a scan of text to find the topic terms within each document. The topic terms for each document may then be grouped, the number of occurrences for each group may be quantified and normalized against the total words in the document. These normalized values may be used to "tag" with a topic term those topic terms that exceed some threshold value (e.g., greater than 4). Documents can be tagged with 0, 1 or more than 1 term according to the normalized values, in some embodiments. Documents without tags can be identified or tagged as "no-tag" which may highlight or send them to a user via interface 211 for special review (e.g., at tagging review 316).

Tagging review 316 may support (or require) creator approval on the tagging and/or may support requests 303 to edit tags. In some embodiments, tagging review 316 may provide a subset of tags associated with documents via interface 211 for review (e.g., those with lower confidence, such as having value less than a confidence threshold number of occurrences). In some embodiments, tagging review 316 may support request to add tags (e.g., that were not initially provided as topic terms) or remove tags that were assigned to a particular document, or remove a tag (e.g., determined automatically from documents 301) from being applied to any document 301.

Representation generation 318 may use, for example, a feature vector representation to finalize the encodings of the topic term tags for documents 301. In some embodiments, representation generation 318 may not begin until approval of the tags is received via interface 211 (at tagging review 316). In some embodiments, representation generation 318 may begin after a tagged set of documents is received (even without approval). Document representations may be generated according to various encoding techniques. For example, unsupervised encoding techniques may be applied to represent tags associated with a document as well as other document features that may be captured in an encoding (e.g., an autoencoder neural network that uses various features of the document and tags to generate an embedding of the features and/or one or more encoding layers of a language model that include both the document and the associated tag(s)). As indicated by the dotted line, in some embodiments, semantic feature vectors may be included as part of representation generation 318. In some embodiments, multiple different topics may be included in a domain, as indicated by the stacked boxes of topic encodings 310. In some embodiments, other information associated with documents 301 may be considered at representation generation 318. For instance, other types of associated data (e.g., image data, video data, audio data) may also be used to generate a feature vector (e.g., by implementing multi-modal encoding techniques).

Document analysis 231 may implement domain encoding 320. Similar to topic encodings, domain encoding may implement domain term identification. 322. Domain term identification 322 may evaluate documents 301 (e.g., using a statistical analysis and an NER model as discussed above) to identify domain terms from the documents 301.

Document domain term tagging 324 may augment, annotate, or otherwise link different topic terms with individual ones of documents 301. For example, each document of document 301 may be evaluated for tagging the potential domain terms, derived from domain term identification 322 using a scan of text to find the domain terms within each document. The domain terms for each document may then be grouped, the number of occurrences for each group may be quantified and normalized against the total words in the document. These normalized values may be used to "tag" with a domain term those domain terms that exceed some threshold value (e.g., greater than 4). Documents can be tagged with 0, 1 or more than 1 domain according to the normalized values, in some embodiments. Documents without tags can be identified or tagged as "no-tag" which may highlight or send them to a user via interface 211 for special review (e.g., at tagging review 326).

Tagging review 326 may support (or require) creator approval on the tagging and/or may support requests 304 to edit tags. In some embodiments, tagging review 326 may provide a subset of tags associated with documents via interface 211 for review (e.g., those with lower confidence, such as having value less than a confidence threshold number of occurrences). In some embodiments, tagging review 326 may support request to add domains (e.g., that were not initially determined at domain term identification 322) or remove tags that were assigned to a particular document, or remove a tag (e.g., determined automatically from documents 301) from being applied to any document 301.

Representation generation 328 may use, for example, a feature vector representation to finalize the encodings of the domain tags for documents 301. In some embodiments, representation generation 328 may not begin until approval of the tags is received via interface 211 (at tagging review 326). In some embodiments, representation generation 328 may begin after a tagged set of documents is received (even without approval). Document representations may be generated according to various encoding techniques. For example, unsupervised encoding techniques may be applied to represent tags associated with a document as well as other document features that may be captured in an encoding (e.g., an autoencoder neural network that uses various features of the document and tags to generate an embedding of the features). As indicated by the dotted line, in some embodiments, semantic feature vectors may be included as part of representation generation 328. In some embodiments, other information associated with documents 301 may be considered at representation generation 328. For instance, other types of associated data (e.g., image data, video data, audio data) may also be used to generate a feature vector (e.g., by implementing multi-modal encoding techniques).

Semantic encoding 330 may utilize a language model encoding 332 to determine respective feature vectors of the semantic content of documents 301, in various embodiments. For example, a pre-trained language model that is general and not specific to the domain, may have one or more encoding layers that are used to generate an embedding of the document's semantic features. In various embodiments, representation generation 334 may then evaluate the semantic feature vectors (e.g., embeddings) for documents 301 to represent the differences between the documents using various feature vector comparison techniques (e.g., cosine similarity, etc.).

Representation aggregation 340 may combine the different feature vector representations to generate a domain aware similarity model 325. For example, as discussed above, may normalize the distance distribution among vector representations from topic encodings 310, domain encoding 320, and semantic encoding 330 to follow a similar distance distribution. Then, the normalized distances may then be combined into a single similarity measure for each document using a customizable weighted average which allows the user to adjust the impact of the individual signals (e.g., adjusting the weight of topic encodings 310, domain encoding 320 and semantic encoding 330). Then, the domain aware similarity model 325 may be output (e.g., as a similarity matrix for each encoding representation).

Representation aggregation 340 may implement interactive review 341, in some embodiments. Creators may adjust the combination weights, as indicated at 305, which interactive review may use to adjust the domain aware similarity model according to the adjustments. In some embodiments, earlier edits, such as edits to tags 303 and 304 may be received, applied, and used to update a domain aware similarity, which may reflected in interface 211 as part of interactive review 341 (e.g., as discussed below with regard to FIGS. 4 through 5B). In some embodiments, interactive review 341 may support saving or marking different versions of a domain aware similarity model, which may then be tested or deployed (as discussed below with regard to FIG. 4).

Figure 4:
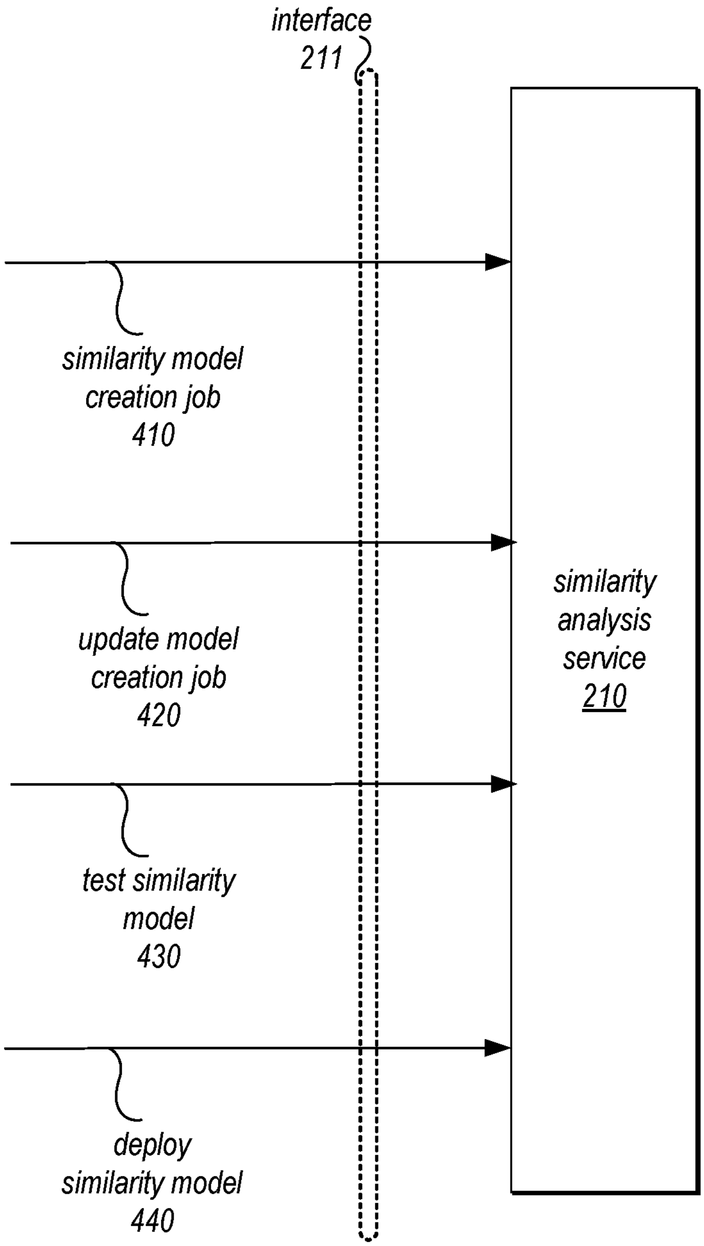
FIG. 4 is a logical block diagram illustrating interactions with similarity analysis for managing the generation of domain aware similarity models, according to some embodiments.

FIG. 4 is a logical block diagram illustrating interactions with similarity analysis for managing the generation of domain aware similarity models, according to some embodiments. As indicated at 410, interface 211 may support similarity model creation job 410, in some embodiments. For example, similarity model creation job request 410 may specify features, such as types of representations used for different encodings (e.g., topic and/or domain), which documents, document location, document format, and various other information for access and obtaining the documents, resource usage limitations, time limits or other criteria that may constrain the model generation, and a number of topics. Update model creation job 420 may be a request that supports adjusting various features of a model creation job that were specified at 410. For example, additional documents may be added or change to the representation models used may be made.

As discussed above with regard to FIG. 2, similarity analysis service 210 may support both testing, as indicated at 430 and deployment of similarity models 440. For example, similarity model testing 214 may be used to load the similarity model into a creator specified test environment or to run a set of predefined tests of similarity analysis service 210. Different types of similarity-based tasks, such as recommendation tasks for various types of content or search tasks for locating various types of content may be tested.

Deploy similarity models 440 may allow for creators to directly deploy similarity models on resources that can, for example, be used to return a similarity analysis according to respective API requests or other commands submitted to the resources. For example, a host system may be provisioned from other services 240 (e.g., a virtual computing service running an instance, container, or other host application), to host a domain aware similarity model. The domain aware similarity model may be deployed to the provisioned host system. A network endpoint or other identifier may be provided in response to request 440 in order to allow client applications to submit requests to the provisioned host system to perform a similarity analysis or task on behalf of the client application.

Figure 5A:
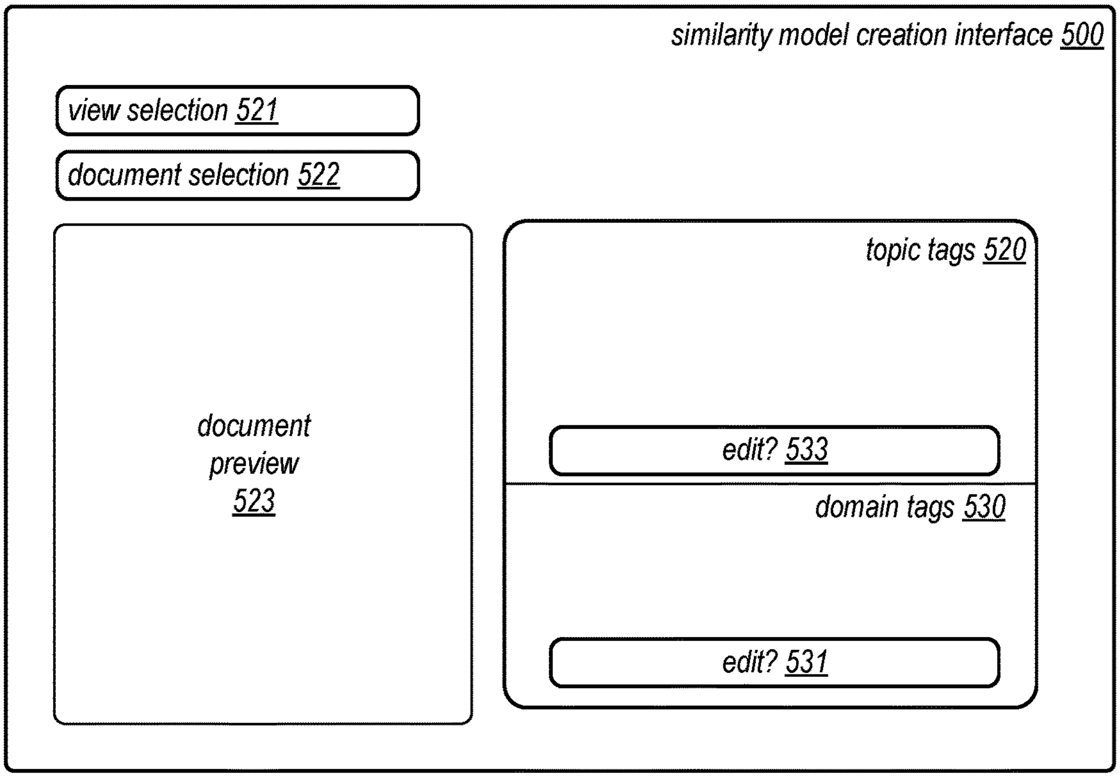
FIG. 5A is an example interface for editing topic and domain terms for a set of documents, according to some embodiments.
Figure 5B:
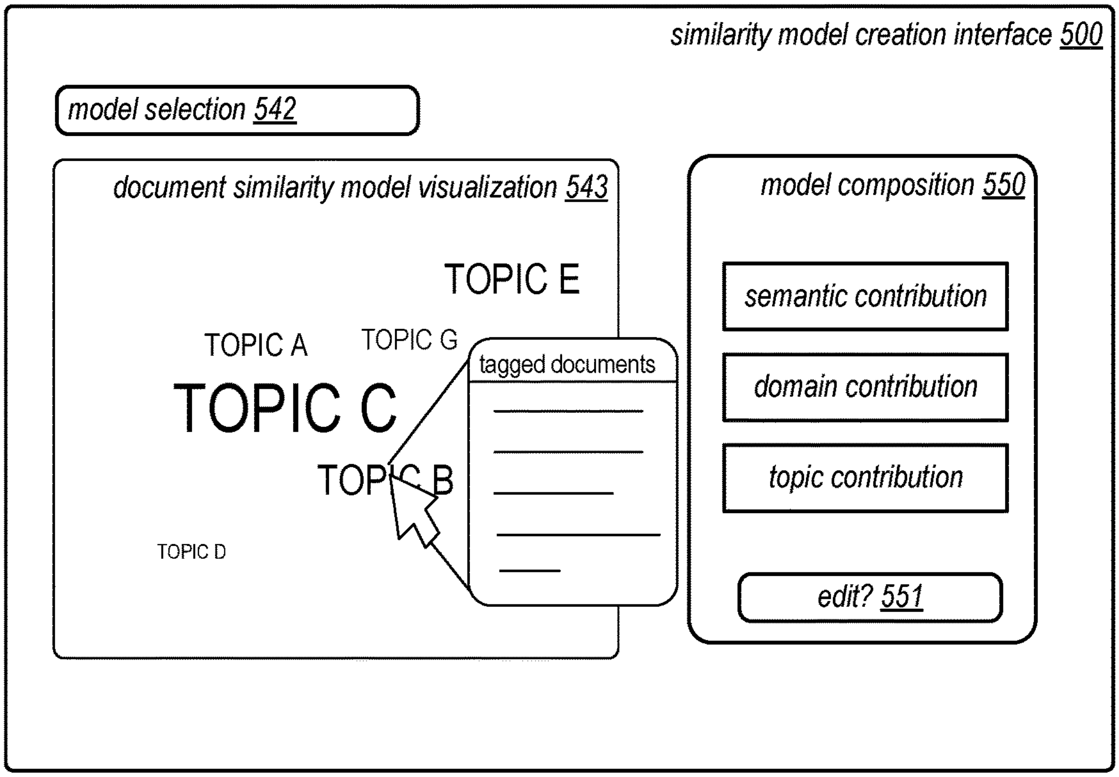
FIG. 5B is an example interface for exploring a domain aware similarity model for a set of documents, according to some embodiments.

As discussed above with regard to FIG. 2, interface 211 may be implemented using various graphical user interface elements. The interface may be hosted as part of a web-service console or other visual service interface to operate or invoke various features of similarity service 210. FIG. 5A is an example interface for editing topic and domain terms for a set of documents, according to some embodiments. As discussed above with regard to FIG. 3, tag edits may be performed at various stages in order to refine or tune the performance of domain aware similarity model. Similarity model creation interface 500 may be an example of an interface that can be used to interact with tags at various stages. View selection 521, for example, can be used to switch between topic encodings and domain encodings in order to review tagging decisions made by document analysis 213 as a group (instead of on a per-document basis). Document selection 522 may be used to select between documents, which may display or describe selected document(s) in document preview 523. In some embodiments, the assigned topic tags 520 may be displayed for a document. Edit element 533 may be used to edit the assigned topic tags (e.g., to add or remove tags). Similarly, in some embodiments, the assigned domain tags 530 may be displayed for a document. Edit element 531 may be used to edit the assigned topic tags (e.g., to add or remove tags). In some embodiments, tag editing may include removing the tag from all documents.

As discussed above with regard to FIG. 3, interactive review 341 may be implemented as part of iterating, refining, and ultimately approving similarity models for deployment. FIG. 5B is an example interface for exploring a domain aware similarity model for a set of documents, according to some embodiments. For example, similarity model creation interface 500 may implement model selection element 542 in order to select from among different similarity models that have been created. For a selected model, document similarity model visualization 542 may be provided, in some embodiments. For example, a graph representation of different documents, or (as illustrated) a word cloud that represents different topics, sized according to frequency and located with respect to other topics according to the similarity or relatedness of the different topics. Visual exploration techniques, such as hovering or clicking a topic may show the tagged documents for that topic. The previous visualization is just an example. Other visualizations can be provided.

The domain aware similarity model that is selected (at 542) have a attributes, such as model composition 550 displayed. Model composition 550 may indicate the different contributions of each type of encoding (e.g., semantic, domain, and topic), as well as their respective weights (e.g., 20% semantic, 50% domain, and 30% topic). In order to understand the impact of the model composition 550 on the domain aware similarity model, edit element 551 may be selected to change the weights of model composition 550. Visualization 542 may be dynamically updated to reflect the changes in model composition 550.

Figure 6:
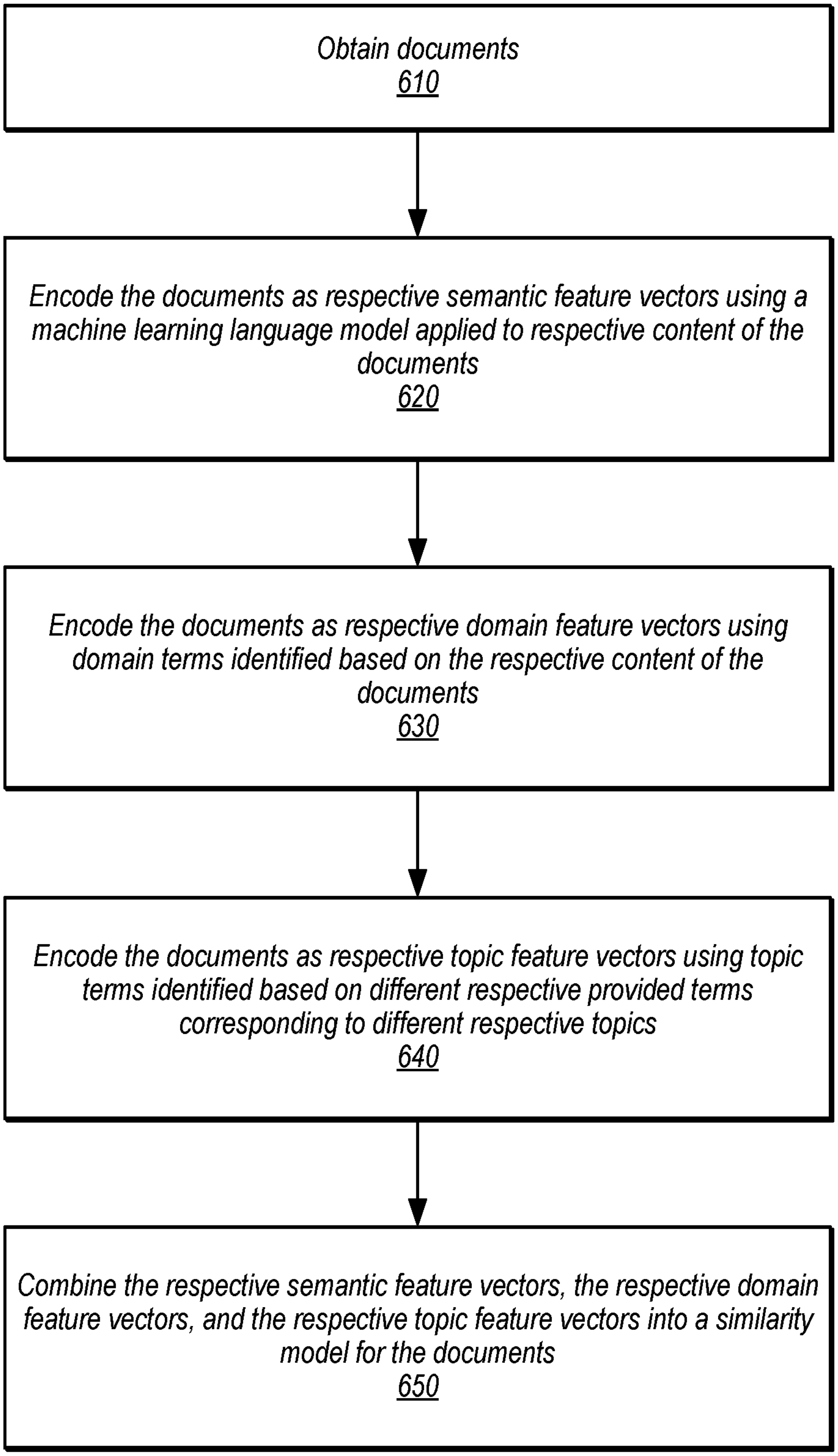
FIG. 6 is a high-level flowchart illustrating techniques and methods to implement aggregated document representations for generating domain aware similarity models, according to some embodiments.

The examples of aggregated document representations for generating domain aware similarity models discussed above with regard to FIGS. 2-5B have been given in regard to one example of a similarity analysis service. Various other types of tools, systems, or applications may implement these techniques. FIG. 6 is a high-level flowchart illustrating techniques and methods to implement aggregated document representations for generating domain aware similarity models, according to some embodiments. These techniques, as well as the techniques discussed below with regard to FIGS. 7-8, may be implemented using various components of a provider network as described above with regard to FIGS. 2-5B or other types or systems implementing code development tools or other applications.

As indicated at 610, documents for generating a domain aware similarity model may be obtained, in some embodiments. For example, the documents may be obtained or identified as part of a request to create or generate a domain aware similarity model, in some embodiments. As discussed above with regard to FIG. 1, documents may include various data files and formats. For example, documents may be analogous to physical documents (e.g., text files, portable document format (PDF), etc.), digital or non-physical documents (e.g., html pages (e.g., stored as Hypertext Markup Language (HTML) documents), blog posts, JavaScript Object Notation (JSON) documents, data objects or other digital content that can be considered documents, such as data items, records or files (including non-text files such as audio, video, or image data) in object stores, non-relational data stores, or document-based data stores.

As indicated at 620, the documents may be encoded as semantic feature vectors using a machine learning language model applied to respective content of the documents, in some embodiments. For example, one or more encoder layers of a pre-trained large language model (or other general language model) may be applied to parsed and tokenized text obtained from a document (e.g., according to various file interpreters that can read text from a file stored in a file format).

As indicated at 630, the documents may be encoded as respective domain feature vectors using domain terms identified based on the respect content of the documents, in some embodiments. For example, as discussed in detail below with regard to FIG. 7, domain terms may be extracted from documents and recognized (e.g., as synonyms of extracted domain terms) and used to tag documents which are then encoded according to the associations between domain terms that are tagged to documents. As indicated at 640, the documents may be encoded as respective topic feature vectors using topic terms identified based on different respective provided terms corresponding to different respective topics. For example, example topic terms can be provided and then further topic terms can be detected from the documents using an NER model. Then, the documents can be tagged with the topic terms and encoded according to the associations between topic terms that are tagged to documents.

As indicated at 650, the respective semantic feature vectors, the respective domain feature vectors, and the respective topic feature vectors may be combined into a similarity model for the documents, in some embodiments. For example, the distance distribution among vector representations from topic feature vectors, domain feature vectors, and semantic feature vectors may be normalized to follow a similar distance distribution. Then, the normalized distances may be combined into a single similarity measure for each document using a customizable weighted average which may be adjustable via edits, as discussed above with regard to FIGS. 3 and 5B. The similarity measures may then be stored together as a domain aware similarity model which can be analyzed, searched, or otherwise used to perform similarity tasks. Then, the domain aware similarity model may be provided (e.g., stored, deployed, or tested).

Figure 7:
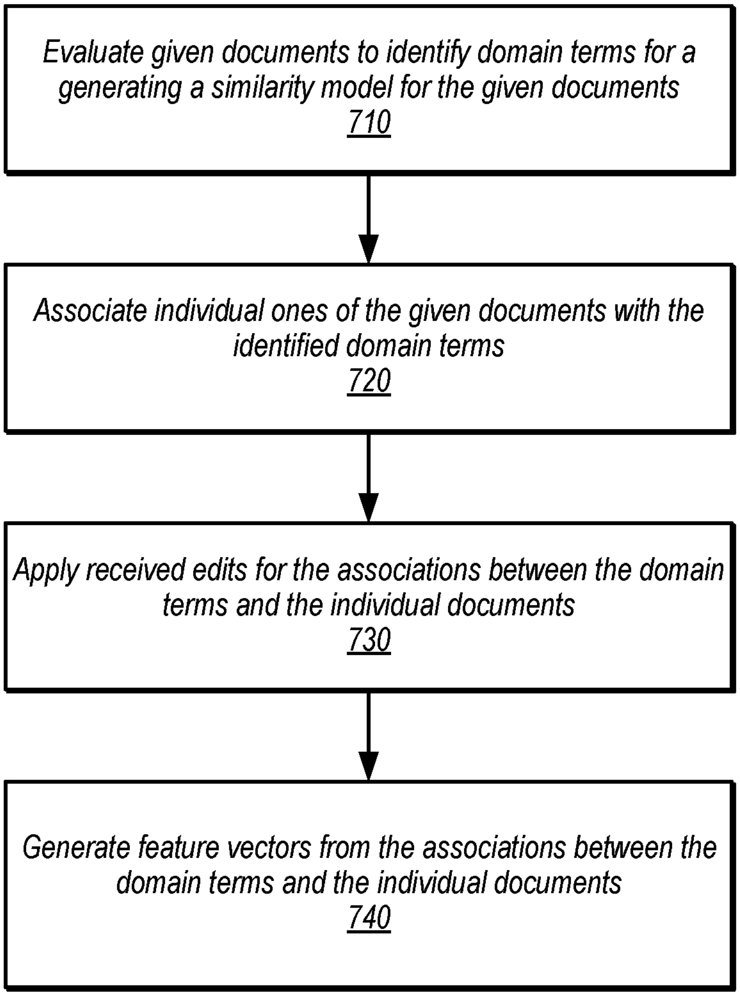
FIG. 7 is a high-level flowchart illustrating techniques and methods to implement domain encoding for generating domain aware similarity models, according to some embodiments.

FIG. 7 is a high-level flowchart illustrating techniques and methods to implement domain encoding for generating domain aware similarity models, according to some embodiments. As indicated at 710, given documents may be evaluated to identify domain terms for generating a similarity model for the given documents, in some embodiments. For example as discussed above, domain terms may be automatically extracted from the documents using statistical evaluation. First, statistically relevant domain terms may be partially identified in documents using various techniques (e.g., using a histogram of the most common words) that evaluate words extracted from or associated with the documents. Semantically similar words may then be grouped using semantic embeddings generated for the statistically relevant words (e.g. using the machine learning language model). For instance, a top p % groups (e.g., by count as indicated in the histogram) are selected and then converted to words again. Common terms may be inferred from generic documents. The detected common terms may then be subtracted from the terms obtained in top p % groups to create the candidate domain terms.

Detected relevant domain terms may be augmented, in some embodiments, by training a few-shot Named Entity Recognition model which is then applied to the same documents to identify remaining domain terms (which may recognize additional terms that are synonyms or related to the statistically detected domain terms). The domain terms (both statistically detected and detected using the NER model) for each document may then be grouped with their nearest synonyms, the number of occurrences for each group is quantified and normalized against the total words in the document.

As indicated at 720, individual ones of the given documents may be associated with the identified domain terms. For example, each of the documents may then be considered for tagging with one or more of the domain terms. As indicated at 730, received edits (or approval) for the associations between the domain terms and the individual documents may be applied, in some embodiments, if any. For example, new tags may be added or tags may be removed.

As indicated at 740, feature vectors may be determined from the associations between the domain terms and the individual documents, in some embodiments. For example, unsupervised encoding techniques may be applied to represent domain tags associated with a document as well as other document features that may be captured in a feature vector (e.g., an autoencoder neural network that uses various features of the document and tags to generate an embedding of the features and/or or encoder layers of a language model). In some embodiments, semantic feature vectors may be included as part of generating the domain feature vectors. In some embodiments, other information associated with documents may be included as part of generating the domain feature vectors, such as other types of associated data (e.g., image data, video data, audio data by implementing multimodal encoding techniques).

Figure 8:
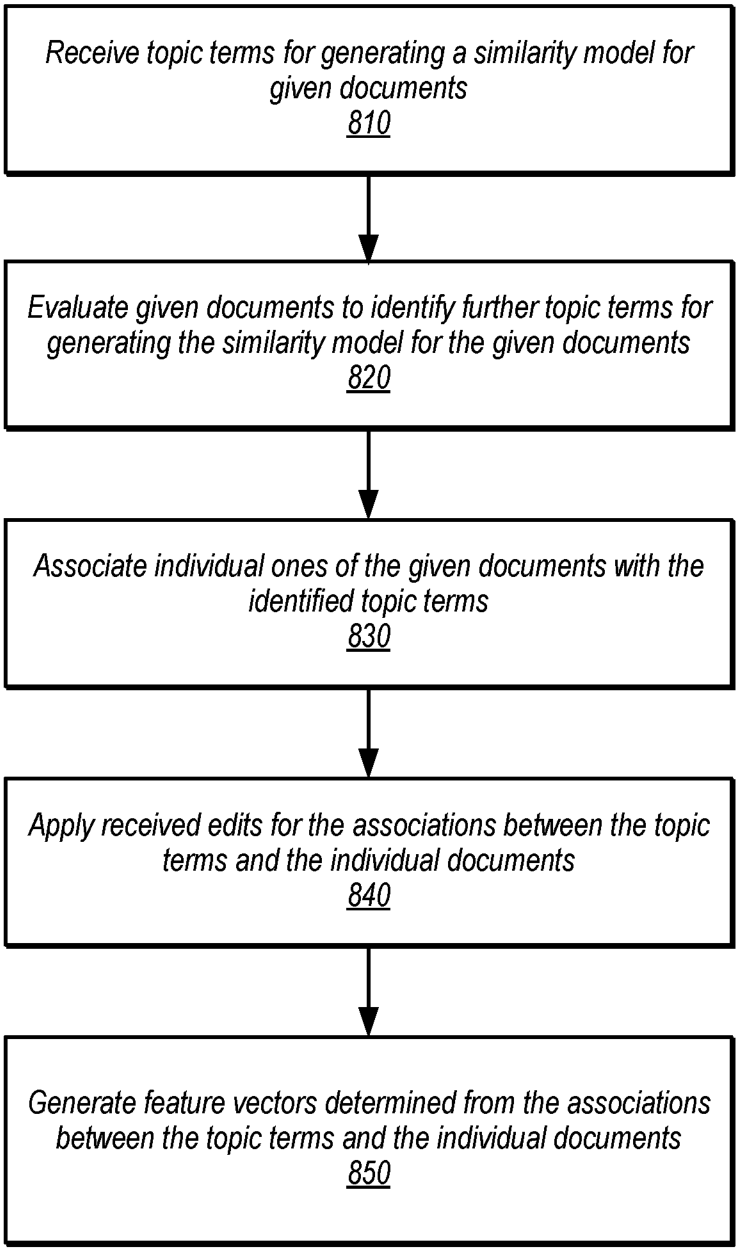
FIG. 8 is a high-level flowchart illustrating techniques and methods to implement topic encoding for generating domain aware similarity models, according to some embodiments.

FIG. 8 is a high-level flowchart illustrating techniques and methods to implement topic encoding for generating domain aware similarity models, according to some embodiments. As indicated at 810, topic terms may be received for generating a similarity model for given documents, in some embodiments. For example, as discussed above with regard to FIGS. 1 and 3, topic terms may be submitted via an interface. As indicated at 820, given documents may be evaluated to identify further topic terms for generating the similarity model for the given documents, in some embodiments.

As indicated at 830, individual ones of the given documents may be associated with the identified topic terms, in some embodiments. For example, a scan of document text may be performed to find the received topic terms (e.g., at 810) and automatically identified (e.g., 820) topic terms within each document may be performed. The topic terms for each document may then be grouped, the number of occurrences for each group may be quantified and normalized against the total words in the document. These normalized values may be used to "tag" with a topic term those topic terms that exceed some threshold value (e.g., greater than 4). Documents can be tagged with 0, 1 or more than 1 term according to the normalized values, in some embodiments.

As indicated at 840, received edits for the associations between the topic terms and the individual documents may be applied, in some embodiments. For example, an interface may support (or require) creator approval on the tagging and/or may support requests to edit tags. In some embodiments, the interview may provide a subset of tags associated with documents for review (e.g., those with lower confidence, such as having value less than a confidence threshold number of occurrences). In some embodiments, the interface may support requests to add tags (e.g., that were not initially provided as topic terms) or remove tags that were assigned to a particular document, or remove a tag (e.g., determined automatically from documents) from being applied to any document.

As indicated at 850, feature vectors determined from the associations between the topic terms and the individual documents, in some embodiments. For example, a feature vector representation to finalize the encodings of the topic term tags for documents may be generated using unsupervised encoding techniques. These unsupervised encoding techniques may be applied to represent topic terms that are associated with a document as well as other document features that may be captured in an encoding (e.g., an autoencoder neural network that uses various features of the document and tags to generate an embedding of the features and/or one or more encoding layers of a language model that include both the document and the associated tag(s)). In some embodiments, semantic feature vectors may be included as part of generating topic feature vectors. In some embodiments, other types of associated data (e.g., image data, video data, audio data) may also be used to generate a topic feature vector (e.g., by implementing multi-modal encoding techniques).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 9:
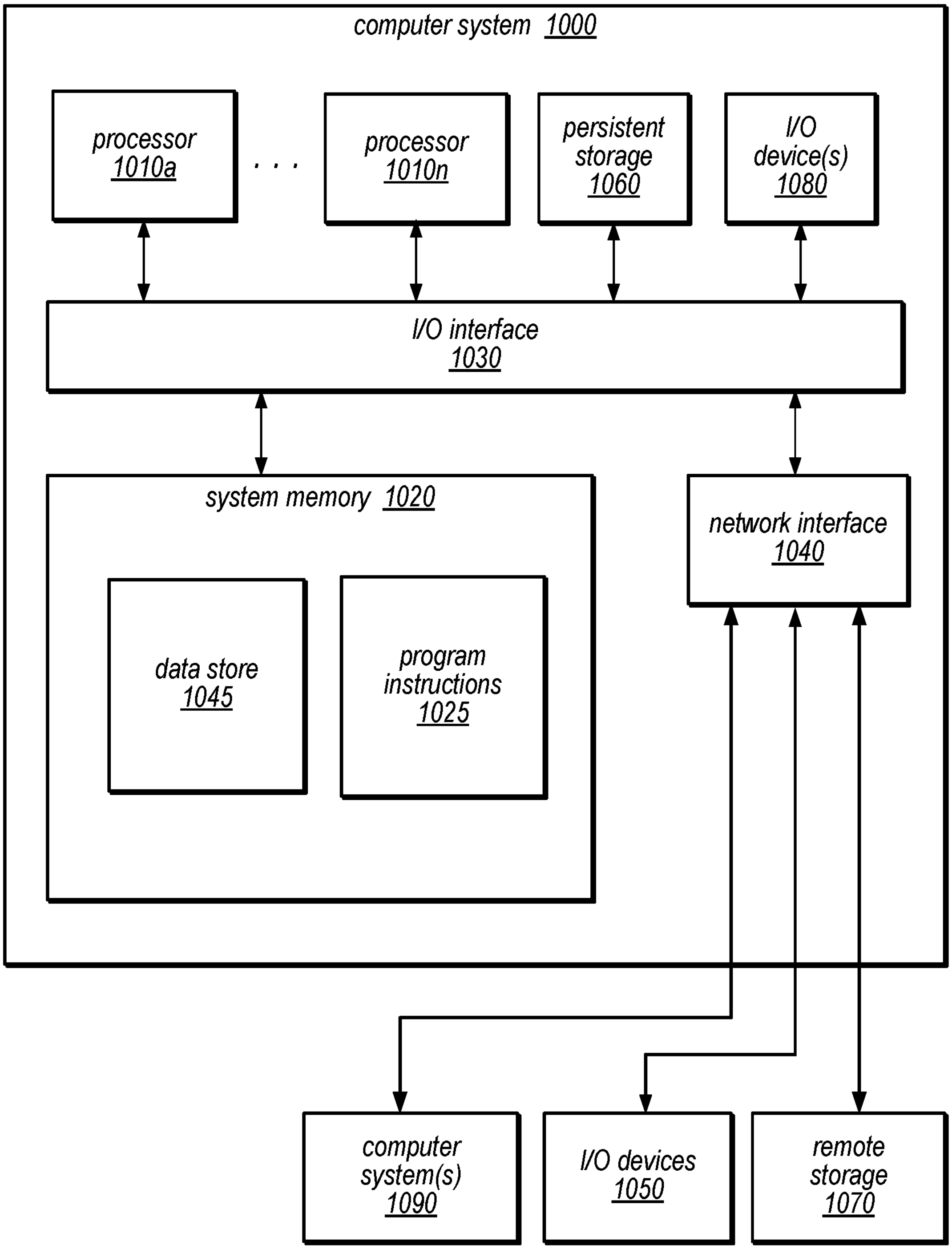
FIG. 9 is a block diagram illustrating an example computing system, according to some embodiments.

Aggregated document representations for generating domain aware similarity models as described herein may be executed on one or more computer systems, which may interact with various other devices. FIG. 9 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments, such as various techniques for discovering matching code sources according to index and comparative similarity. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

at least one processor; and a memory storing program instructions that when executed by the at least one processor, cause the at least one processor to implement a similarity analysis system, configured:

receive a request to generate a similarity model for a plurality of documents;

generate the similarity model for the plurality of documents, wherein to generate the similarity model, the similarity analysis system is configured to:

encode the plurality of documents as respective semantic feature vectors using a machine learning language model applied to respective content of the plurality of documents;

encode the plurality of documents as respective domain feature vectors using domain terms identified based, at least in part, on the respective content of the plurality of documents;

encode the plurality of documents as respective topic feature vectors using topic terms identified based, at least in part, on different respective provided terms corresponding to different respective topics; and combine the respective semantic feature vectors, the respective domain feature vectors, and the respective topic feature vectors into a similarity model for the plurality of documents; and provide the similarity model.

2. The system of claim 1, wherein to encode the plurality of documents as respective domain feature vectors, the similarity analysis system is configured to:

evaluate the plurality of documents to identify domain terms according to a statistical evaluation of the domain terms occurrence in the plurality of documents;

associate individual ones of the plurality of documents with the identified domain terms; and generate the domain feature vectors based on the associations between the identified domain terms and the individual documents.

3. The system of claim 1, wherein to encode the plurality of documents as respective topic feature vectors, the similarity analysis system is configured to:

receive one or more initial topic terms via an interface;

evaluate the plurality of documents to identify further topic terms;

associate individual ones of the plurality of documents with the received topic terms and the further topic terms; and generate the topic feature vectors based on the associations between the received topic terms and the further topic terms and the individual documents.

4. The system of claim 1, wherein the similarity analysis system is implemented as a service offered by a provider network and wherein the request is received via an interface of the service.

5. A method, comprising:

obtaining, by a document similarity analysis system, a plurality of documents;

encoding, by the document similarity analysis system, the plurality of documents as respective semantic feature vectors using a machine learning language model applied to respective content of the plurality of documents;

encoding, by the document similarity analysis system, the plurality of documents as respective domain feature vectors using domain terms identified based, at least in part, on the respective content of the plurality of documents;

encoding, by the document similarity analysis system, the plurality of documents as respective topic feature vectors using topic terms identified based, at least in part, on different respective provided terms corresponding to different respective topics; and combining, by the document similarity analysis system, the respective semantic feature vectors, the respective domain feature vectors, and the respective topic feature vectors into a similarity model for the plurality of documents.

6. The method of claim 5, wherein encoding the plurality of documents as respective domain feature vectors comprises:

evaluating the plurality of documents to identify domain terms according to a statistical evaluation of the domain terms occurrence in the plurality of documents;

associating individual ones of the plurality of documents with the identified domain terms; and generating the domain feature vectors based on the associations between the identified domain terms and the individual documents.

7. The method of claim 6, further comprising updating one of the associations between one of the domain terms and the individual documents responsive to an edit request.

8. The method of claim 5, wherein encoding the plurality of documents as respective topic feature vectors comprises:

receiving one or more initial topic terms via an interface;

evaluating the plurality of documents to identify further topic terms;

associating individual ones of the plurality of documents with the received topic terms and the further topic terms; and generating the topic feature vectors based on the associations between the received topic terms and the further topic terms and the individual documents.

9. The method of claim 8, further comprising adding an additional topic term to include in the associations between one of the topic terms and the individual documents responsive to an edit request.

10. The method of claim 5, further comprising executing one or more text similarity analyses using the similarity model generated for the plurality of documents responsive to a request to test the similarity model.

11. The method of claim 5, further comprising deploying the similarity model to one or more computing resources that perform similarity analyses when invoked at the one or more computing resources responsive to a request to deploy the similarity model.

12. The method of claim 5, wherein combining the respective semantic feature vectors, the respective domain feature vectors, and the respective topic feature vectors into the similarity model for the plurality of documents comprises normalizing a distance distribution among the respective semantic feature vectors, the respective domain feature vectors, and the respective topic feature vectors and combining the normalized distance distributions into a single similarity measure.

13. The method of claim 5, wherein combining the respective semantic feature vectors, the respective domain feature vectors, and the respective topic feature vectors into the similarity model for the plurality of documents is performed according to respective weights specified in a request.

14. One or more non-transitory, computer-readable storage media, storing program instructions that when executed on or across one or more computing devices cause the one or more computing devices to implement:

obtaining a plurality of documents;

encoding the plurality of documents as respective semantic feature vectors using a machine learning language model applied to respective content of the plurality of documents;

encoding the plurality of documents as respective domain feature vectors using domain terms identified based, at least in part, on the respective content of the plurality of documents;

encoding the plurality of documents as respective topic feature vectors using topic terms identified based, at least in part, on different respective provided terms corresponding to different respective topics; and combining the respective semantic feature vectors, the respective domain feature vectors, and the respective topic feature vectors into a similarity model for the plurality of documents.

15. The one or more non-transitory, computer-readable storage media of claim 14, wherein, in encoding the plurality of documents as respective domain feature vectors, the program instructions cause the one or more computing devices to implement:

evaluating the plurality of documents to identify domain terms according to a statistical evaluation of the domain terms occurrence in the plurality of documents;

associating individual ones of the plurality of documents with the identified domain terms; and generating the domain feature vectors based on the associations between the identified domain terms and the individual documents.

16. The one or more non-transitory, computer-readable storage media of claim 14, wherein, in encoding the plurality of documents as respective topic feature vectors the program instructions cause the one or more computing devices to implement:

receiving one or more initial topic terms via an interface;

evaluating the plurality of documents to identify further topic terms;

associating individual ones of the plurality of documents with the received topic terms and the further topic terms; and generating the topic feature vectors based on the associations between the received topic terms and the further topic terms and the individual documents.

17. The one or more non-transitory, computer-readable storage media of claim 16, storing further program instructions that when executed on or across the one or more computing devices cause the one or more computing devices to further implement updating one of the associations between one of the received topic terms or further topic terms and the individual documents responsive to an edit request.

18. The one or more non-transitory, computer-readable storage media of claim 14, storing further program instructions that when executed on or across the one or more computing devices cause the one or more computing devices to further implement executing one or more text similarity analyses using the similarity model generated for the plurality of documents responsive to a request to test the similarity model.

19. The one or more non-transitory, computer-readable storage media of claim 14, wherein combining the respective semantic feature vectors, the respective domain feature vectors, and the respective topic feature vectors into the similarity model for the plurality of documents comprises normalizing a distance distribution among the respective semantic feature vectors, the respective domain feature vectors, and the respective topic feature vectors and combining the normalized distance distributions into a single similarity measure.

20. The one or more non-transitory, computer-readable storage media of claim 14, wherein the one or more computing devices are implemented as a similarity analysis service offered by a provider network and wherein the plurality of documents are obtained via an interface of the service.

* * * * *